United States Patent [19]

Uchida et al.

[11] Patent Number: 4,625,761
[45] Date of Patent: Dec. 2, 1986

[54] CORROSION-RESISTANT, QUICK DISCONNECTING COUPLING ASSEMBLY FOR PIPING USE

[75] Inventors: Tatsuro Uchida, Osaka; Hisayuki Matsumoto, Takatsuki; Teiji Arita, Yokohama, all of Japan

[73] Assignees: Daikin Industries, Osaka; Yokohama Aeroquip Co. Ltd., Tokyo, both of Japan

[21] Appl. No.: 667,260

[22] Filed: Nov. 1, 1984

[30] Foreign Application Priority Data

Nov. 2, 1983 [JP] Japan .................................. 58-206650
Nov. 14, 1983 [JP] Japan .................................. 58-214584

[51] Int. Cl.⁴ .............................................. F16L 37/28
[52] U.S. Cl. ............................ 137/614.03; 137/614.01; 251/149.8
[58] Field of Search ..................... 137/614.01, 614.03, 137/614.04; 251/149.6, 149.8

[56] References Cited

U.S. PATENT DOCUMENTS

| | | | |
|---|---|---|---|
| 2,304,390 | 12/1942 | Wolfrom | 137/614.03 |
| 2,456,045 | 12/1948 | Brock | 137/614.03 |
| 2,678,834 | 5/1954 | Courtot | 137/614.02 |
| 2,854,259 | 9/1958 | Clark | 137/614.03 |
| 3,039,794 | 6/1962 | DeCenzo | 137/614.03 |
| 3,446,245 | 5/1969 | Snyder, Jr. | 137/614.03 |
| 4,086,939 | 5/1978 | Wilcox et al. | 137/614.03 |
| 4,219,048 | 8/1980 | Ekmon | 137/614.03 |

FOREIGN PATENT DOCUMENTS 581087 10/1946 United Kingdom ........... 137/614.03

*Primary Examiner*—A. Michael Chambers
*Attorney, Agent, or Firm*—Flynn, Thiel, Boutell & Tanis

[57] ABSTRACT

A corrosion-resistant, quick disconnecting coupling assembly for piping use consisting of a female coupling and a male coupling for causing or stopping the conduction of a fluid by connection or disconnection between both is provided. The female coupling and the male coupling comprise each an exterior coupling body, a cylindrical valve member mounted in the body so as to form an annular closed chamber enclosed by the former two, which member has therethrough communicating transverse and longitudinal holes as a flow path of the fluid and a spring housed in the chamber so as to be compressible or extensible. The valve member is wholly or partially slidable. The one valve member may consist of a fixed valve and a slidable valve sleeve and the other valve member may be a slidable poppet valve. Each of the valve members may be a poppet valve which is slidable. O-rings are incorporated to avoid leakage of fluid to the spring chambers and to ensure a leak-tight seal of the fit portions of both the couplings upon connection. The female and male bodies and the female and male valve members are made of a synthetic plastic, preferably a fluoroplastic, the O-rings of the female and male couplings are made of a synthetic rubber, preferably a fluororubber, and the female and male springs are coated with a synthetic plastic, preferably a fluoroplastic.

16 Claims, 15 Drawing Figures

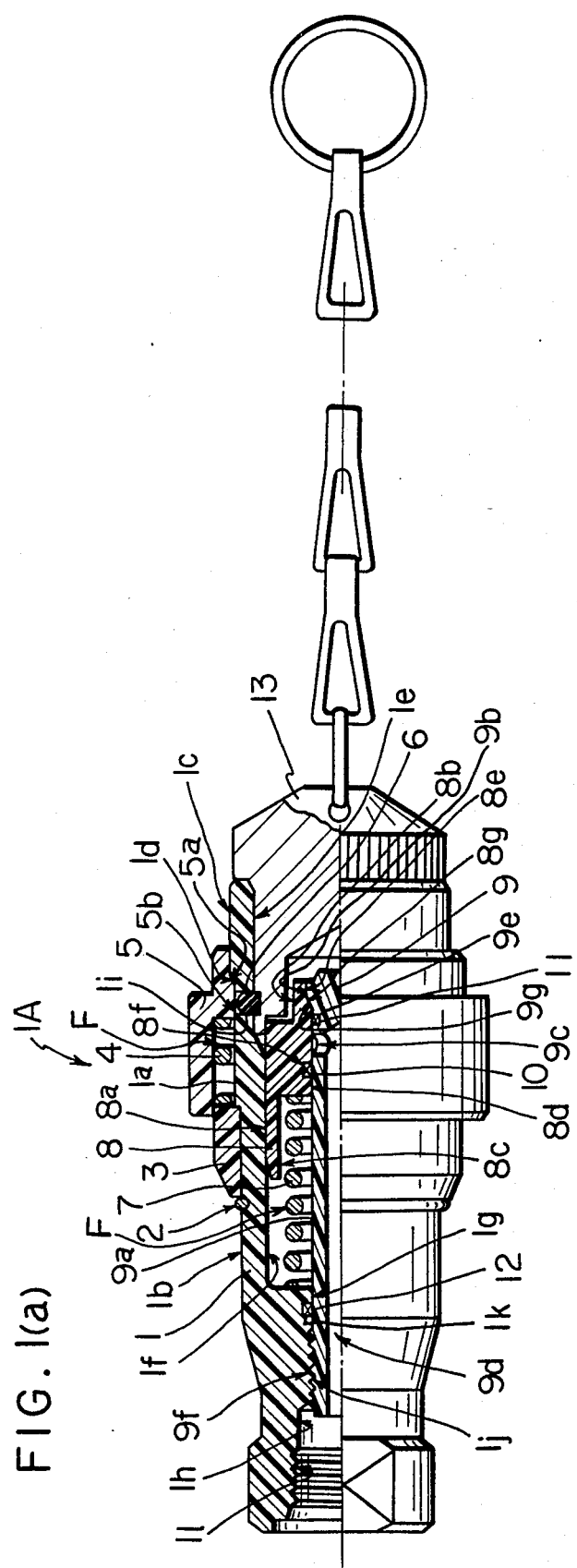

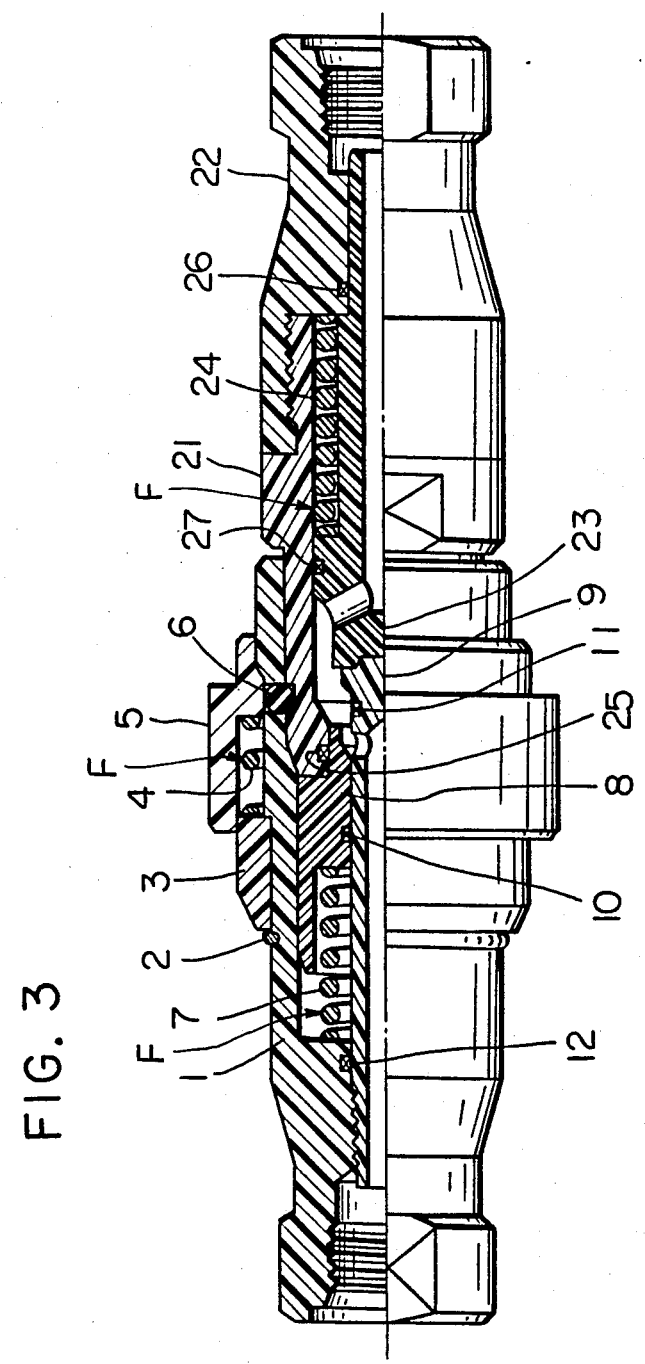

CORROSION-RESISTANT, QUICK DISCONNECTING COUPLING ASSEMBLY FOR PIPING USE

FIELD OF THE INVENTION

This invention relates to a coupling assembly for piping designed for use in transporting corrosive fluids, e.g. such acids or alkalis that are used for wet etching apparatus of semiconductors. More particularly, it relates to a corrosion-resistant, quick disconnecting coupling assembly for piping use which is resistant to chemical substances and with which to enable easy and safe handling in feeding corrosive fluids to an apparatus.

DESCRIPTION OF THE PRIOR ART

A typical liquid most usually used for wet etching of semiconductors is hydrofluoric acid in the form of an aqueous solution which is deleterious to the human bodies and susceptible to dissolving metals or glass. For instance, in feeding such liquid into a wet etching apparatus, hitherto, the liquid contained in a small-size polyethylene container has been emptied by manual handling into the tank of the wet etching apparatus. This feeding method is, however, very dangerous owing to possible splashing of the liquid and entails a time-consuming, cautious and laborious work. This is true also when another corrosive fluids of acids or alkalis are likewise fed from their containers into a required tank by manual work, and the work was very dangerous and time-consuming.

Further, there is known a method in which corrosive fluids are fed under pressurization with the aid of a pump, but to that end an expensive resin diaphragm pump and piping are required and attaching work of the pump is time-consuming.

In the present state of art, if in order that a corrosive fluid in a container can be fed into a required tank without using a pump by pressurization, for example by exerting a gas pressure, the container is beforehand attached with the one set of pipe and coupling and shipped while the tank is beforehand attached with the other set of pipe and coupling, feeding of such fluid will be expedient by simple and easy handling of connection and disconnection between both sets of pipes and couplings. However, existing couplings for piping use have never been applicable to corrosive fluids. This is because existing quick disconnecting type of couplings for piping which are typical of couplings for piping are constructed so that female coupling and male coupling are connected or disconnected to cause or stop the flowing of a fluid are made of metals, and springs used for valves of the female and male couplings are disposed within a space serving as a path of fluid flow and exposed to corrosive fluids. Even if the couplings are made of synthetic plastics, it was not feasible to use such couplings for feeding of corrosive fluids such as acids or alkalis because of the inherency that the springs are susceptible to corrosion.

One example of prior art quick disconnecting couplings for use in piping is, for example, disclosed in Japanese published Utility Model Application (Unexamined) No. 56-101292 (1981) as illustrated in FIG. 11. In FIG. 11, a female coupling 40 is constructed of a female body 41, the interior of which comprises a fixed valve 44, a spring 43 and a valve sleeve 42 serving to close an open top of the female body 41 which sleeve is slidably movable, urged by the spring 43 while a male coupling 50 is constructed of a male body 51 and a poppet valve 52 incorporating a spring 53 provided within the male body 51 so as to be slidably movable and serving to close an open top end of the male body 51. And a union nut 45 is releasably mounted on the outer periphery of the female coupling 40. When the union nut 45 is threaded onto the outer periphery of the male body 51 to connect the female and male couplings 40, 50 to each other, the valve sleeve 42 and the poppet valve 52 recede back and the open tops of the female and male bodies 41, 51 are put in communication with each other.

The coupling for piping use of this type is, however, wholly made of metals and the springs are located in the flow path of a liquid, so that the coupling is defective in that it cannot be used for feed of corrosive fluids by reason of its property of undergoing corrosion.

SUMMARY OF THE INVENTION

In view of the prior art drawbacks described above, this invention has been accomplished to overcome them, and has for an essential object to provide a corrosion-resistant, quick disconnecting coupling assembly for use in piping which can be used between pipes for feeding corrosive fluids such as acids or alkalis.

In order to attain the object, the coupling assembly is constructed so that slidably moving metal springs and self-closing parts of valves are disposed within a coupling body in a space isolated from a fluid flow so as not to be in direct contact with the fluid; means for impeding leakage of the fluid to the springs during connection or disconnection operations of the coupling assembly is provided; valve members constituting an essential element of the coupling assembly are made of a chemical resistant material whereby to afford a corrosion-resistant construction; the coupling assembly can be handled, upon connection and disconnection, by simple and easy push or pull action of it and safely without any leakage of liquid.

That is, according to one aspect of this invention, there is provided a corrosion-resistant, quick disconnecting coupling assembly made of a plastic for piping uses consisting of a female coupling and a male coupling for causing or stopping the conduction of a fluid by connection or disconnection between the both, in which assembly the female coupling comprises an exterior female body, a fixed valve mounted within the female body to be threadedly fastened to it on the rear side thereof which valve has therethrough a transverse hole and a longitudinal hole each serving as a flow path of the fluid and communicating with each other, a valve sleeve slidably mounted to the female body and the fixed valve interposing the both, and a spring housed in an annular chamber enclosed by the female body, the fixed valve and the valve sleeve so as to be compressible or extensible; and the male coupling comprises an external male body, a poppet valve slidably mounted in the male body so as to form an annular chamber enclosed by the male body and the poppet valve, which poppet valve has therethrough a transverse hole and a longitudinal hole serving each as a flow path of the fluid and communicating with each other and a male spring housed in the annular chamber so as to be compressible or extensible.

The coupling assembly is preferably constructed so that the valve sleeve and the female body of the female coupling have an O-ring incorporated respectively in fit positions in front of and at the rear of the female spring, and the poppet valve and the male body of the male coupling have an O-ring incorporated respectively in fit positions in front of and at the rear of the male spring whereby to ensure a fluid-tight seal of the chambers of the female and male springs and that the male body has an O-ring incorporated in its top inner face to ensure a leak-tight seal between the male and female couplings upon connection or disconnection.

According to another aspect of this invention, there is provided a corrosion-resistant, quick disconnecting coupling assembly made of a synthetic plastic consisting of a female coupling and a male coupling, in which assembly the female coupling comprises an exterior female body which is surmounted by a sub-body on the front side and includes an adaptor on the rear side of the female body, a female poppet valve slidably mounted in the female body to be fitted to the adapter and the sub-body thereby to define an annular chamber enclosed by the both, and a female spring housed in the annular chamber so as to be compressible or extensible; and the male coupling comprises an exterior male body, a fixed valve mounted in the male body to be fastened to the male body on the rear side of the valve, a valve sleeve slidably mounted to the male body and the fixed valve interposing the both thereby to define an annular chamber enclosed by the male body, the fixed valve and the valve sleeve, and a male spring housed in the annular chamber to be compressible or extensible.

Preferably, the coupling assembly is further constructed so that the female poppet valve and the adapter have each O-ring incorporated respectively in fit positions in front of and at the rear of the female spring, and the male valve sleeve and the male body have an O-ring incorporated respectively in fit positions in front of and at the rear of the male spring, whereby to avoid fluid leakage into the spaces taken up by the female and male springs, and that the sub-body of the female body has an O-ring incorporated in its top portion to impede the leakage of fluid from the fit faces between the female and male couplings outside upon connection or disconnection.

According to a further aspect of this invention, a corrosion-resistant, quick disconnecting coupling assembly made of a synthetic plastic consisting of a female coupling and a male coupling is provided, in which each of the couplings comprises an exterior body, a poppet valve slidably mounted in the exterior body so as to define an annular chamber enclosed by the exterior body and the poppet valve and having therethrough a transverse hole and a longitudinal hole, as a flow path of fluid, communicating with each other, and a spring housed in the chamber interposing the exterior body and the poppet valve so as to be compressible or extensible.

The coupling assembly is preferably further constructed so that each of the female and male poppets and each of the exterior female and male bodies have an O-ring incorporated respectively in the fit positions in front of and at the rear of each spring thereby to secure a fluid-tight seal of the space taken up by the spring, and the female body has an O-ring incorporated in its top inner portion to ensure a leak-tight seal upon connection.

By the construction described above, when the female and male couplings are connected to each other, the male body of the male coupling is received and fitted in the female body of the female coupling in a telescoping manner, the female valve member and the male valve member are retreated up to the compression limit positions of the female and male springs with the top edges of the both being in abutment to each other, and the longitudinal and transverse holes of the female valve member and the longitudinal and transverse holes of the male valve member are put in communication with one another.

In order to further render the coupling assembly corrosion-resistant, it is preferred that the valve members are made of fluoroplastics having good chemical resistance as well as general synthetic plastics, the O-rings are made of fluororubbers having a good chemical resistance and elasticity as well as synthetic rubbers, and the springs are coated with fluoroplastics as well as synthetic plastics to ensure their corrosion resistance to a liquid which may leak by way of the O-rings to the spaces of the springs although these are not in direct contact with the flowing liquid. The coupling assembly constructed in this manner is particularly useful for piping to feed strong acids or strong alkalis.

BRIEF DESCRIPTION OF THE DRAWINGS

Preferred embodiments of this invention will be hereinafter described with reference to the accompanying drawings, in which:

FIGS. 1a–1c is a half sectional view of one example of this invention showing a female coupling as the one companion unit;

FIG. 3 is a half sectional view of one example of the coupling assembly of this invention showing the state that the female coupling of FIG. 1 and the male coupling of FIG. 2 are completely connected;

DETAILED DESCRIPTION

Figure 2A:
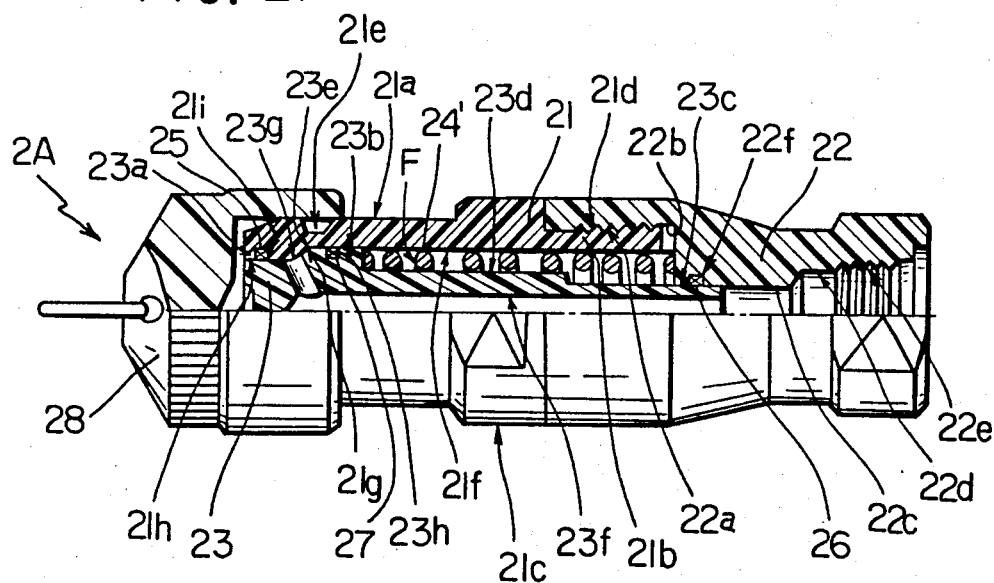
FIGS. 2a–2c is a half sectional view of one example of this invention showing a male coupling as the other companion unit to the unit in FIG. 1.
Figure 2B:
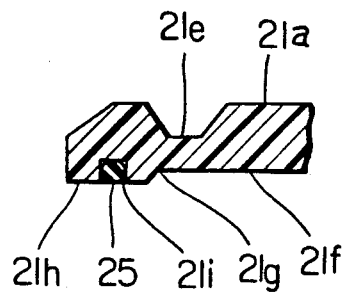
Figure 2C:
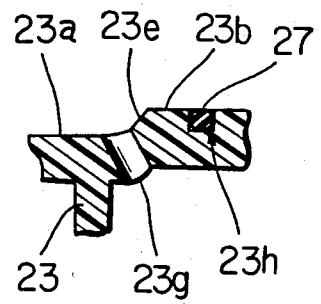

Now referring to FIG. 1 to FIG. 3, there is shown one example of this invention in which a female coupling 1A, a male coupling 2A and the connecing state of the female and male couplings are illustrated in order.

The female coupling 1A will be explained. On an intermediate cylinder portion 1a of a female body 1, a sleeve 5 which is slidingly movable by means of a spring 4 is slidably mounted, interposed by a collar 3 which is fixed and retained by a stop ring 2 to a small cylinder portion 1b. The sleeve 5 has, in the inner portion thereof, a conical face 5a such that can be engaged with a conical face 1d formed on a top cylinder portion 1c of the female body 1 to the stopped there so that the sleeve 5 may not be disengaged from the conical face 1d and not be moved toward the top cylinder portion 1c of the female body 1.

The interior longitudinal bore of the female body 1 is profiled, in order from the top cylinder portion 1c side, with a large-radius longitudinal bore 1e, a medium-radius longitudinal bore 1f, a small-radius longitudinal bore 1g and an access hole 1h to a pipe serving as a fluid passage to or from a pipe.

The intermediate cylinder portion 1a is defined, on the same circumferential line, with a plurality of conical transverse apertures 1i pierced through the large-radius longitudinal bore 1e, in which apertures plastic balls 6 are received. The plastic balls 6 are retained by a bore portion 5b of the sleeve 5 so that these balls 6 may not fall out of the intermediate cylinder portion 1a, thus serving as a detent. To the medium-radius longitudinal bore 1f of the female body 1, a valve sleeve 8 is mounted to be slidably movable by a spring 7 which is incorporated, coiled around the outer periphery of a fixed valve 9 threadedly fastened to the small-radius longitudinal bore 1g.

The outer cylinder of the valve sleeve 8 is made up of a sliding cylinder portion 8a which is slidably mounted to the medium-radius longitudinal bore 1f and a small-radius top cylinder portion 8b.

The inner longitudinal bore of the valve sleeve 8 is defined with a large-radius longitudinal bore 8c serving as a receiving member for the spring 7, a small-radius longitudinal bore 8d slidably mounted to a medium cylinder portion 9a of the fixed valve 9, and a medium-radius longitudinal bore 8e fitting therein an annular protruding cylinder portion 9b located at the top of the fixed valve 9. The small-radius longitudinal bore 8d is defined thereon with an O-ring groove 8f in which an O-ring 10 is incorporated lest the inside fluid should leak into the area of the medium-radius longitudinal bore 1f of the female body 1 during sliding movement along the medium cylinder portion 9a of the fixed valve 9.

The fixed valve 9 has a transverse hole 9c and a longitudinal hole 9d communicating with each other and serving each as a flow path of fluid. The medium cylinder portion 9a is, at the one end thereof, defined with an O-ring groove 9e in which an O-ring 11 is received to ensure a leak-tight seal of the inside fluid. It is, at the other opposite end, provided with a male screw 9f which is threaded into a female screw 1j formed on the small-radius longitudinal bore 1g of the female body 1, whereby the fixed valve 9 is firmly fastened to the female body 1. Further, an O-ring groove 1k is profiled in the small-radius longitudinal bore 1g of the female body 1 and incorporated with an O-ring 12 therein so that the inside fluid may not leak from the fitting area between the small-radius longitudinal bore 1g of the female body 1 and the medium cylinder portion 9a of the fixed valve 9 into the area of the medium-radius longitudinal bore 1f of the female body 1.

The valve sleeve 8 slidingly moving by means of the spring 7 is mounted to the medium-radius longitudinal bore 1f of the female body 1, enclosed by the fixed valve 9. After the fabrication of the valve sleeve 8, a conical face 9g formed at the one end of the annular projecting cylinder portion 9b of the fixed valve 9 is held is engagement with a conical face 8g formed in the medium-radius longitudinal bore 8e of the valve sleeve 8, so that there is no danger for the valve sleeve 8 of disengaging from the fixed valve 9. The access hole 1h to a pipe of the female body 1 is formed with a female screw 1l so as to be capable of piping to an apparatus.

The male coupling is, as illustrated in FIG. 2, constructed of a male body 21, an adaptor 22, a poppet valve 23, a spring 24 and O-rings 25, 26, 27.

The male body 21 is formed of a fit cylinder portion 21a adapted to be fitted in the large-radius longitudinal bore 1e of the female body 1, a medium cylinder portion 21c and a terminal cylinder portion 21b having a small radius. The terminal cylinder portion 21b is provided with a male screw 21d threaded in a female screw 22a formed on the adaptor 22 whereas the fit cylinder portion 21a is defined with an annular groove 21e assuming a V-shape in the top area thereof.

The interior longitudinal bore of the male body 21 is profiled with a large-radius longitudinal bore 21f in the area extending from the terminal cylinder portion 21b to the annular groove 21e of the fit cylinder portion 21a, from which bore 21f a tapered conical face 21g extends and interconnects to a small-radius longitudinal bore 21h.

The inner longitudinal bore of the adaptor 22 is profiled with a large-radius longitudinal bore 22b having a female screw 22a at the one end thereof, a middle, small-radius longitudinal bore 22c and an access hole 22d to a pipe serving as a passage for a fluid at the other end thereof. The access hole 22d is formed, on its inner circumference, with a female screw 22e so as to be connected directly to a pipe of an apparatus.

After the male screw 21d of the male body 21 and the female screw 22a of the adaptor 22 are threadedly fastened to each other, the poppet valve 23 is mounted in the large-radius longitudinal bore 21f of the male body 21 to be slidably movable by means of the spring 24.

The outer cylinder profile of the poppet valve 23 is formed of a fit cylinder portion 23a which is slidably mounted in the small-radius longitudinal bore 21h of the male body 21 and has the same outer radius as the top cylinder portion 8b of the valve sleeve 8 within the female body 1, a large-radius cylinder portion 23b movable slidingly in the large-radius longitudinal bore 21f of the male body 21, a small-radius cylinder portion 23c movable slidingly in the small-radius longitudinal bore 22c of the adaptor, and a medium-radius cylinder portion 23d which is offset outwardly from the small-radius longitudinal bore 22c and limits a retreating position of the poppet valve 23. The large-radius cylinder portion 23b is formed with a tapered conical face 23e on the fit cylinder portion 23a side. The conical face 23e is defined with a transverse hole 23g communicating with a longitudinal hole 23f serving as a flow path of a fluid.

The small-radius longitudinal bore 21h of the male body 21 is defined with an O-ring groove 21i to incorporate an O-ring 25 therein so that inside fluid may not leak from the fit area between the small-radius longitudinal bore 21h of the male body 21 and the fit cylinder portion 23a of the poppet valve 23 outside. Further, the large-radius cylinder portion 23b of the poppet valve 23 and the small-radius longitudinal bore 22c of the adapter 22 are defined respectively, in the fit area between the large-size longitudinal bore 21f of the male body 21 and the large-size cylinder portion 23b of the poppet valve 23 and in the fit area between the small-radius longitudinal bore 22c of the adapter 22 and the small-radius cylinder portion 23c of the poppet valve 23, with O-ring grooves 23h and 22f to incorporate an O-ring 27 and an O-ring 26 therein in order that the inside fluid may not flow into the chamber taken up by the spring 24 within the large-radius longitudinal bore 21f of the male body 21.

After the poppet valve 23 is incorporated within the male body 21, the conical face 23e formed on the large-radius cylinder portion 23b of the poppet valve 23 is captively held by the conical face 21g formed on the large-radius longitudinal bore 21f, so that the poppet valve 23 is never dismounted from the male body 21.

The female coupling and the male coupling may be equipped with a cap 13 and a cap 29, respectively at the top ends of the female and male bodies for the protection of them, and they are capped when the coupling assembly is not used upon disconnection.

Figure 4:
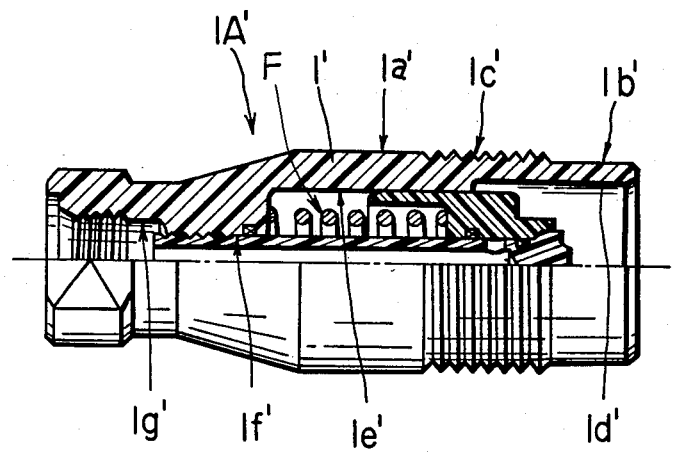
FIG. 4 is a half sectional view of another example of this invention showing a female coupling as the one companion unit.
Figure 5:
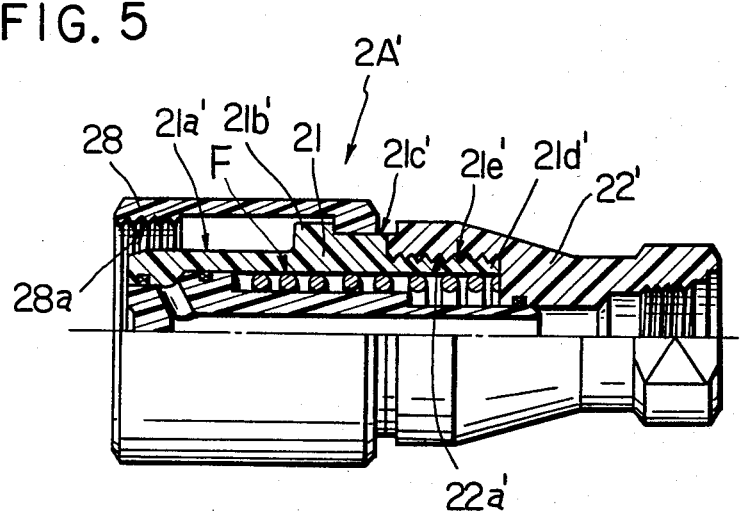
FIG. 5 is a half sectional view of another example of this invention showing a male coupling as the other companion unit to the unit of FIG. 4.
Figure 6:
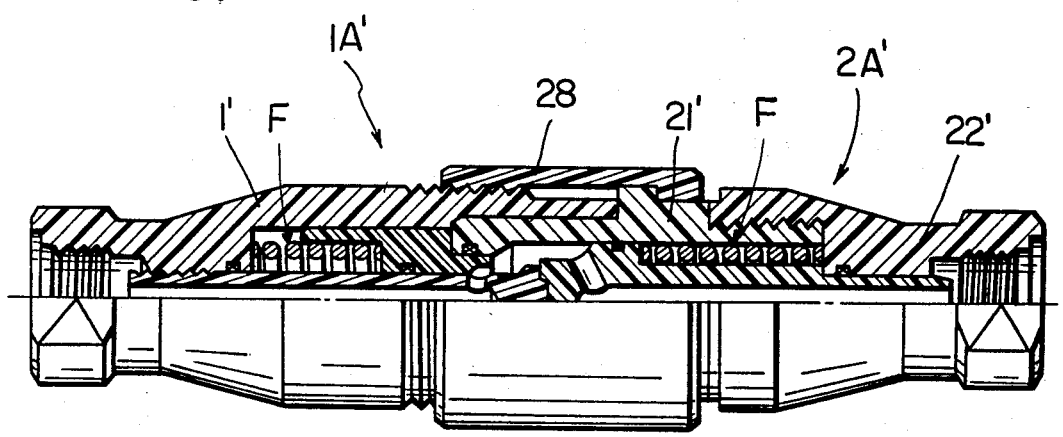
FIG. 6 is a half sectional view of another example of the coupling assembly according to this invention showing the state that the female coupling of FIG. 4 and the male coupling of FIG. 5 are completely connected.

Another example of this invention is illustrated in FIG. 4 to FIG. 6 in which a female coupling 1A', a male coupling 2A' and the former two in a connected state are shown in order.

The female coupling 1A' has a female body 1' comprising a medium cylinder portion 1a' and a top cylinder portion 1b' having a small radius. The medium cylinder portion 1a' is formed with a male screw 1c' on the top cylinder portion 1b' side.

The inner-radius longitudinal bore of the female body 1' is profiled with, from the top cylinder portion 1b' side, a large-radius longitudinal bore 1d', a medium-radius longitudinal bore 1e', a small-radius longitudinal bore 1f' and an access hole 1g' serving as a passage of a fluid.

The other constitution elements of the female coupling and constructions of them are similar to those as described in the foregoing example of the female coupling 1A shown in FIG. 1.

The male coupling 2A' shown in FIG. 5 has a male body 21' comprising a fit cylinder portion 21a' adapted to be fitted in the large-radius longitudinal bore 1d' of the female body 1', a large-radius cylinder portion 21b', a medium-radius cylinder portion 21c' and a terminal cylinder portion 21d' having a small radius.

The terminal cylinder portion 21d' has a male screw 21e' thereon to be threaded into a female screw 22a' formed on the inner side of an adapter 22'. On the medium-radius cylinder portion 21c' of the male body 21' is rotatably mounted a union nut 28 which has, therein, a female screw 28a to be threaded onto the male screw 1c' formed on the medium cylinder portion 1a' of the female body 1'.

The other constituent elements and their constructions are the same as described in the foregoing example of the male coupling 2A in FIG. 2.

Figure 7:
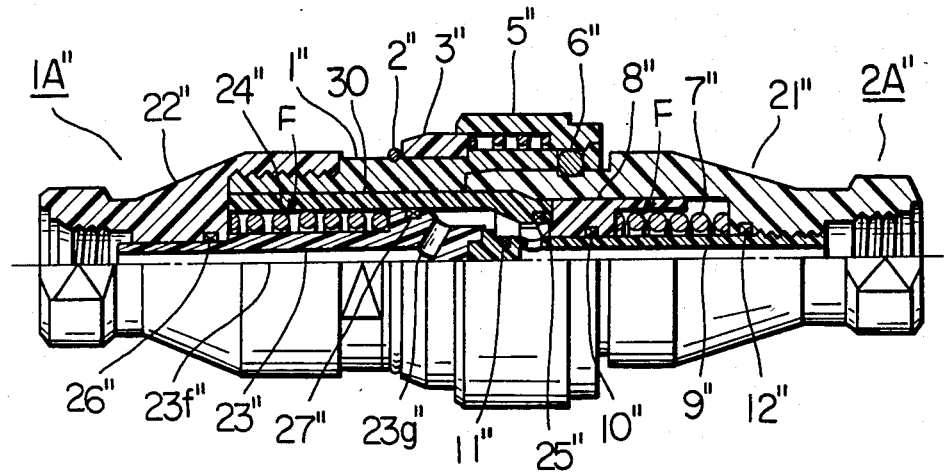
FIG. 7 is a half sectional view of a further coupling assembly embodying this invention showing completely connected state of a further male coupling and a further female coupling.

A further example of this invention is illustrated in FIG. 7 in which a female coupling 1A" and male coupling 2A" are in the connection state.

This is just reverse to the first example in construction. In this example, valve members of the female coupling 1A" and the male coupling 2A" are constructed by the interchange between the valve member of the male coupling 1A and the valve member of the female coupling 2A shown in FIG. 1 to FIG. 3, and the other constructions are similar to the first example except that a sub-body 30 is incorporated in a female body 1" so as to be surmounted thereby.

More specifically, the female coupling 1A" is constructed of the female body 1", adapter 22", stop ring 2", collar 3", sleeve 5", plastic balls 6", sub-body 30, O-ring 25", spring 24", poppet valve 23", O-rings 26" and 27", longitudinal hole 23f" and transverse hole 23g" serving each as a flow path of fluid whereas the male coupoing 2A" is constructed of a male body 21", valve sleeve 8", spring 7", fixed valve 9", O-ring 11". Differences of this example in FIG. 7 from the example of FIG. 1 to FIG. 3 are that the O-rings 27 and 26 provided respectively in the fit area between the male body 21 and the poppet valve 23 at the front and rear positions of the spring 24 are changed to the O-rings 27" and 26" provided respectively in the fit area, on the sub-body 30 side, of the poppet valve 23" in the female body 1" at the front and rear positions of the spring 24" and that the O-ring 25 incorporated in the peripheral area of the small-radius longitudinal bore 21a in the open top area of the male body 21 is changed to the O-ring 25" incorporated in the top inner peripheral area of the sub-body 30.

The other constituent elements and their constructions are similar to those of the first example shown in FIG. 1 to FIG. 3, and so, further explanation will be unnecessary.

According to these examples of the female body 1 as shown in FIG. 1 and FIG. 7 the plastic balls 6 are captured in the transverse aperture 1i defined in the intermediate cylinder portion 1a and serve as a detent when received in the annular groove 21e defined in the fit cylinder portion 21a of the male body 21. The balls 6 may be replaced by an arcuate pin assuming a circular form in the longitudinal cross-section or any other member of any shape that will act as a detent.

Figure 8:
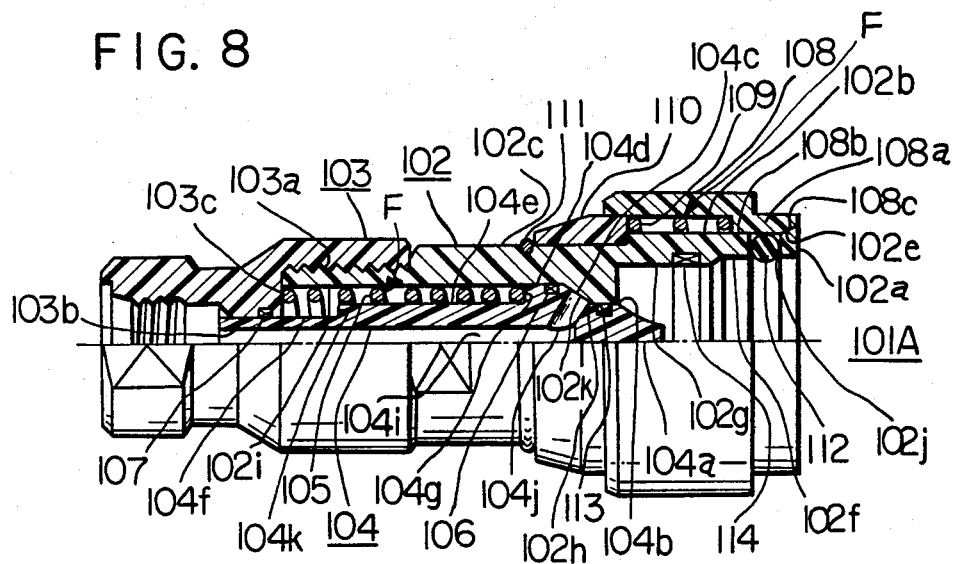
FIG. 8 is a half sectional view of a still further example of this invention showing a female coupling as the one companion unit.
Figure 9:
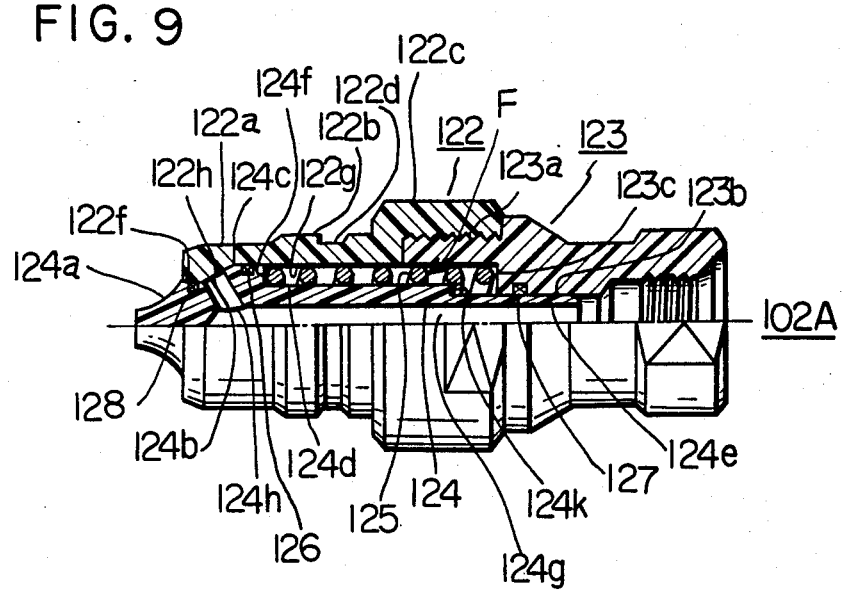
FIG. 9 is a half sectional view of a still further example of this invention showing a male coupling as the other companion unit to the unit shown in FIG. 8.
Figure 10:
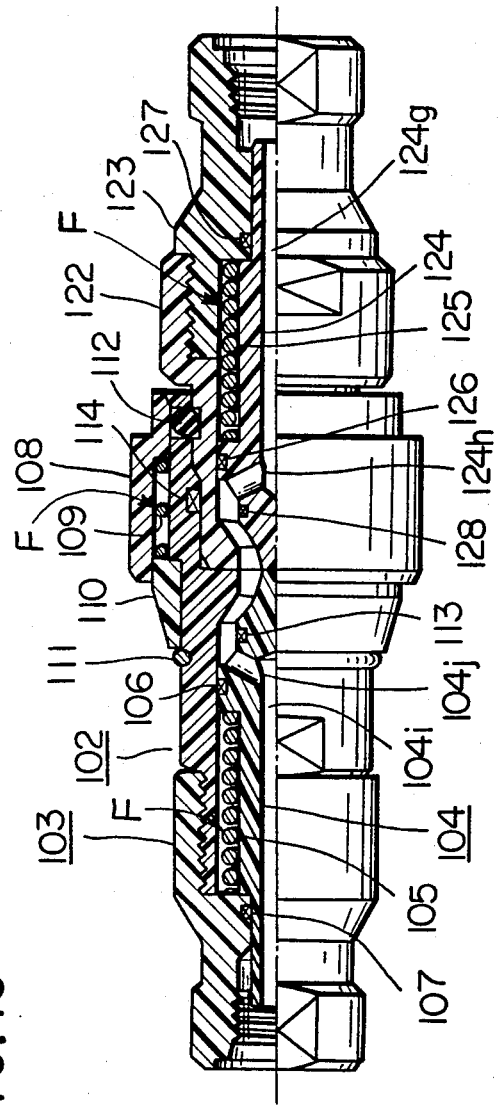
FIG. 10 is a half sectional view of a still further example of the coupling assembly according to this invention showing the state that the female coupling of FIG. 8 and the male coupling of FIG. 9 are completely connected.
Figure 11:
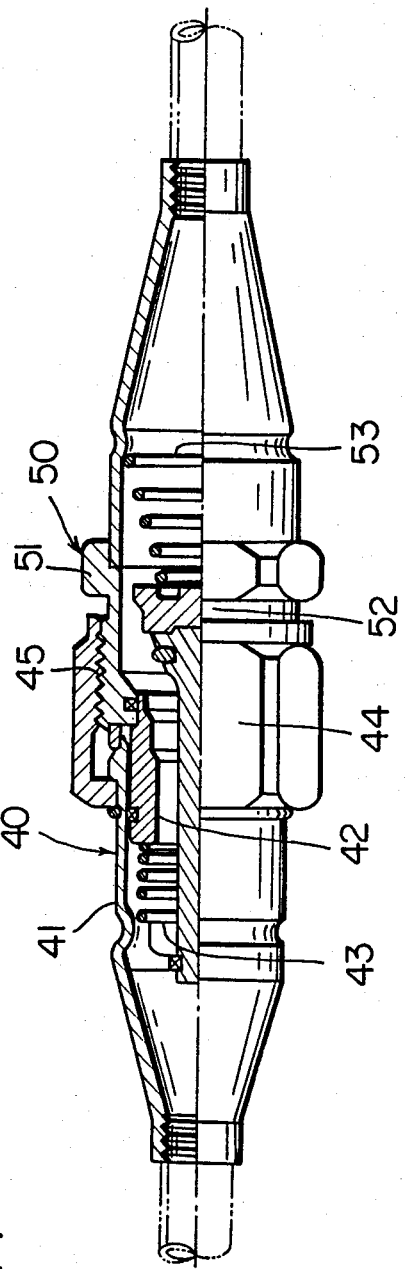
FIG. 11 is a half sectional view of a prior art coupling assembly in the state that the female and male couplings are completely connected.

A still further example of this invention is illustrated in FIG. 8 to FIG. 10 in which a female coupling 101A, a male coupling 102A and the former two in a connected state are shown in order.

The female coupling 101A has an exterior female body 102 including an adapter 103 whose top inner portion 103a is threadedly fastened to the outer rear portion of the female body 102.

The reference numerals 104, 105 are respectively a female poppet and a spring provided on the outer periphery side of the female poppet 104. The female poppet 104 is slidably mounted in the female body 102, interposed by the spring 105.

In the sliding area between the female poppet 104 and the female body 102 and in the sliding area between the female poppet 104 and the adapter 103, an O-ring 106 and an O-ring 107 are respectively incorporated in the female poppet 104 and in the adapter 103 to ensure a leak-tight seal of the liquid into the chamber of the spring 105.

The female body 102 is made up of, from the top side, a top cylinder portion 102a, a medium cylinder portion 102b and a small cylinder portion 102c. On the medium cylinder portion 102b of the female body 102, a sleeve 108 is mounted, interposed by a collar 110 fixed and retained to the small cylinder portion 102c by a stop ring 111 so as to be slidably movable by a spring 109. The sleeve 108 has, on its top inner portion, a conical face 108c which is retained in engagement with a conical face 102e formed on the top cylinder portion 102a of the female body 102 so that the sleeve 108 may not be dismounted from the top cylinder portion 102a of the female body 102.

The inner longitudinal bore of the female body 102 is made up of, from the top cylinder portion 102a side, a large-radius longitudinal bore 102f, a medium-radius longitudinal bore 102g having an O-ring 114, a small-radius longitudinal bore 102h, a rear medium-radius longitudinal bore 102i and a conical face 102k extending between the small-radius bore 102h and the rear bore 102i.

The medium cylinder portion 102b is, on the same circumferential line thereof, pierced through the large-radius longitudinal bore 102f to define a plurality of conical transverse apertures 102j in which plastic balls 112 are received. The plastic balls 112 are retained by a bore portion 108b of the sleeve 108 so that these cannot fall out of the medium cylinder portion 102b of the female body 102, and when the sleeve 108 is pressed back, they move radially outwardly, retained by the conical face 108c, thus acting as a detent.

The female poppet 104 is made up of, from the top side, a top cylinder portion 104a, a medium cylinder portion 104b, a conical face 104c, a large cylinder portion 104d, a rear medium cylinder portion 104e and a small cylinder portion 104f. The medium cylinder portion 104b is slidably fitted to the small-radius longitudinal bore 102h by an O-ring 113 incorporated in it; the large cylinder portion 104d to the rear medium-radius longitudinal bore 102a by the O-ring 106 incorporated therein; the small cylinder portion 104f to a small-radius longitudinal bore 103b of the adapter 103 by the O-ring 107 incorporated in the small-radius longitudinal bore 103b.

On the outer periphery of the rear medium cylinder portion 104e extending between an offset upright portion 104g from the large cylinder portion 104d and an offset upright portion 103c of the adaptor 103 is mounted the spring 105, whereby the female poppet 104 is enabled to slidingly move by the spring 105 within the female body 102 including the adpator 103.

The conical face 104c of the female poppet 104 is retained by the engagement with the conical face 102k of the female body 102, so that it is impeded from dismounting from the female body to advance.

The poppet valve 104 is, within it, defined with an axial longitudinal hole 104a and a transverse hole 104j piercing through the conical face 104c, which holes serve each as a flow path of a fluid and communicate with each other.

An offset upright portion 104k located between the rear medium cylinder portion 104e and the small cylinder portion 104f serves to limit the receding position of the female poppet 104, when pressed back, abutting on the adapter 103.

As for the male coupling 102A, a male body 122 includes a male adapter 123 threadedly fastened, on its outer top end 123a, to the rear inner end of the male body.

In the male body 122 including the male adapter 123, a male poppet 124 is slidably mounted, interposed by a spring 125 which is disposed on the outer periphery of the male poppet 124.

The reference numerals 126 and 127 designate, respectively, an O-ring located in front of and at the rear of the spring 125. The O-ring 126 is incorporated in the male poppet 124 in the sliding area between the male poppet 124 and the male body 122 and the O-ring 127 is incorporated in the adapter 123 in the sliding area between the male poppet 124 and the adapter 123, thereby to ensure a leak-tight seal so that fluid cannot leak into the annular chamber accommodating the spring 125.

The male body 122 is formed of, from the top side, a top cylinder portion 122a, a medium cylinder portion 122b, and a large cylinder portion 122c. The top cylinder portion 122a and the medium cylinder portion 122b have the same radius as the medium-radius transverse bore 102g of the female body 102 and the large-radius longitudinal bore 102f of the female body 102, respectively.

By this construction, when the female coupling 101A and the male coupling 102A are put in connection, the top cylinder portion 122a and the medium cylinder portion 122b of the male body 122 are received and fitted in the medium-radius longitudinal bore 102g and the large-radius longitudinal bore 102f, respectively. Concurrently, the plastic balls 112 of the female body 102 fall into an annular groove 122d defined in the medium cylinder portion 122b, whereby the female and male couplings 101A, 102A are firmly fastened to each other.

The inner longitudinal bore of the male body 122 is made up of, from the top cylinder 122a side, a small-radius longitudinal bore 122f, a large-radius transverse bore 122g and a conical face 122h therebetween.

The male poppet 124 is formed of, from the top, a top cylinder portion 124a, a conical face 124b, a large cylinder portion 124c, a medium cylinder portion 124d and a small cylinder portion 124e. The top cylinder portion 124a is fitted slidably to the small-radius longitudinal bore 122f of the male body 122 by an O-ring 128 incorporated in it; the large cylinder portion 124c to the large-radius longitudinal bore 122g of the male body 122 by an O-ring 126 incorporated in it; the small cylinder portion 124e to the small-radius longitudinal bore 123b of the adapter 123 by an O-ring 127 incorporated in it.

On the outer periphery of the medium cylinder portion 124d extending between an offset upright portion 124f of the large cylinder portion 124c and the medium cylinder portion 124d and an offset upright portion 123c is mounted an spring 125, whereby the male poppet can move slidingly in the male body 122 including the adapter 123, interposed by the spring 125. The conical face 124b of the male poppet 124 is retained by the engagement with the conical face 122h of the male body 122, so that the male poppet is impeded dismounting from the male body to advance.

The interior of the male poppet 124 is defined with an axial longitudinal hole 124g and a transverse hole 124h pierced through the conical face 124b, both acting as a flow path of fluid and communicating with each other.

An offset upright portion 124k between the medium cylinder portion 124d and the small cylinder portion 124e acts to limit the receding position of the male poppet 124, when retreated backward, abutting on the adapter 123.

In this example, the sleeve 108 and the plastic balls 112 are used for the connection between the female and male couplings 101A, 102A, but the balls may be replaced with any other members of any shapes other than spherical shape that can act as a detent. Otherwise, a union nut may be used, instead.

The female coupling and the male coupling may be equipped each with a cap (not shown) for covering the top ends of the female and male bodies for the protection of the interiors upon disconnection.

Now, the operations of connection and disconnection between the female coupling and the male coupling thus constructed will be explained.

When the female coupling 1A of FIG. 1 and the male coupling 2A of FIG. 2 will be put in connection as shown in FIG. 3, first of all, the sleeve 5 mounted on the intermediate cylinder portion 1a of the female body is pushed back toward the small cylinder portion 1b thereby to enable a plurality of the plastic balls 6 captured in the medium cylinder portion 1a to move freely radially outwardly clear of the aperture 1i in the intermediate cylinder portion 1a. Then, the fit cylinder portion 21a of the male body 21 is plugged into the large-radius longitudinal bore 1e of the female body 1 until the edge face of the annular projecting cylinder portion 9b of the fixed valve 9 and the edge face of the fit cylinder portion 23a of the poppet valve 23 which is held slidably in the male body 21 by the spring 24 abut on each other.

As the fit cylinder portion 21a of the male body 21 is further pushed into the female body, the poppet valve 23 in the male body 21 begins to recede toward the adapter 22, following which the top cylinder portion 8b of the valve sleeve 8 in the female body 1 advances toward and is fitted into the small-radius longitudinal bore 21h of the male body 21. At this time, the fluid flowing out through the transverse hole 23g of the poppet valve 21 never leaks outside owing to the fact that the top cylinder portion 8b of the valve sleeve 8 is tightly sealed by the O-ring 25 set in the small-radius longitudinal bore 21h in the male body; and the inside fluid never flows into the chamber of the spring 24 within the large-radius longitudinal bore 21f of the male body 21, either, because the large-radius longitudinal bore 21f of the male body 21 and the small-radius cylinder portion 23c of the poppet valve 23 are sealed tightly by the O-rings 27, 26 set in the poppet valve and the adapter 22.

When the fit cylinder portion 21a of the male body 21 is further pushed into, the edge face of the fit cylinder portion 21a and the boundary face between the sliding cylinder portion 8a and the top cylinder portion 8b of the valve sleeve 8 come in contact with each other. Concurrently with this, the valve sleeve 8 begins to retreat toward the access hole 1h, and the passages of the fixed valve 9 in the female body 1 begin to be opened and are put in communication with the passages in the male body 21 which have already been opened, whereby the fluid is caused to flow through the passages of both couplings. In this condition, there is no occurrence of leakage such that the inside fluid flows into the chamber of the spring 7 within the medium-radius longitudinal bore 1f of the female body 1.

When the fit cylinder portion 21a of the male body 21 is finally pushed into the male body, the plastic balls 6 in a free state received in the medium cylinder portion 1a of the female body 1 fall onto the annular groove 21e of a V-shape defined on the top area of the fit cylinder portion 21a. Then, the sleeve 5 forced back to far reverts to the initial position by the force of the spring 4 and the plastic balls 6 are securely retained by the bore portion 5b of the sleeve 5. Thus, connection operation of the female coupling 1A and the male coupling 2A is finished.

In this connection condition, where the passages within the female coupling 1A and the passages within the male coupling 2A are completely opened as shown in FIG. 3, there is neither leakage of inside fluid into the outside owing to the fact that the top cylinder portion 8b of the valve sleeve 8 is tightly sealed by the O-ring 25 incorporated in the small-radius longitudinal bore 21h, nor flowing of the fluid into the chamber of the spring 24 enclosed by the large-radius longitudinal bore 21f of the male body 21 because of the fact that the large-radius longitudinal bore 21f of the male body 21 and the small-radius cylinder portion 23c of the poppet valve 23 are tightly sealed by the O-rings 27, 26 set in the poppet valve 23 and the adapter 22, respectively. There is no flowing of the fluid into the chamber of the spring 7 in the female body 1, either, because the O-ring 12 incorporated in the female body 1 and the O-ring 10 incorporated in the valve sleeve 8

In disconnecting the female coupling 1A and the male coupling 2A in the connection state from each other, the lug sleeve 5 mounted on the medium cylinder portion of the female body 1 is pushed back toward the small cylinder portion 1b. Then, the plastic balls 6 which have been securely held to the bore portion 5b of the sleeve 5 are released from there to be movable freely radially outwardly of the medium cylinder portion 1a. As a consequence, these are urged radially outwardly, to an extent sufficient for them to move clear of the groove 21e on the fit cylinder portion 21a of the male body, of the medium cylinder portion 1a of the female body 1 by the reaction forces of both the spring 7 mounted in the medium-radius longitudinal bore 1f of the female body 1 and the spring 24 mounted in the male body 21, enclosed by the poppet valve 23. Thus, the female coupling 1A and the male coupling 2A can be disconnected from each other.

During disconnection, on the side of the female coupling 1A, the valve sleeve 8 advances toward the large-radius longitudinal bore 1e by the reaction force of the spring 7 until the conical face 8g formed on the medium-radius longitudinal bore 8e of the valve sleeve 8 abuts against the conical face 9g formed on the annular projecting cylinder portion 9b of the fixed valve 9. Accordingly, the valve sleeve 8 is impeded from sliding further and becomes the state shown in FIG. 1.

During and after this process, the inside fluid never flows out through the longitudinal hole 9c as a flow path in the fixed valve 9 to leak into the outside since the small-radius longitudinal bore 8d of the valve sleeve 8 is sealed by the O-ring 11 incorporated in the fixed valve 9. Further, the O-rings 12 and 10 incorporated in the female body 1 and the valve sleeve 8 seal the medium cylinder portion 9a of the fixed valve 9, so that the inside fluid never flows into the chamber of the spring 7 within the medium-radius longitudinal bore 1f of the female body 1 during sliding or upon stopping of the valve sleeve 8.

On the other hand, on the male coupling 2A side, when the boundary face between the slide cylinder portion 8a and the top cylinder portion 8b of the valve sleeve 8 mounted in the female body 1 and the face of the fit cylinder portion 21a of the male body 21 abut on each other, the male body 21 is pressed back in the direction of the adapter 22 by the reaction forces of both the spring 7 in the female body 1 and the spring 24 in the male body 21. Concurrently, the fit cylinder portion 23a of the poppet valve 23 advances toward and is fitted to the small-radius longitudinal bore 21h of the male body 21 and the conical face 23e of the poppet valve 23 is abutted against the conical face 21g formed on the large-radius longitudinal bore 21f of the male body 21, whereby the action of the poppet valve 23 is impeded. Thus, the male coupling ultimately assumes the state shown in FIG. 2.

During and after the disconnection operation, the inside fluid never flows outside since the O-ring 25 incorporated in the small-radius longitudinal bore 21h of the male body 21 seals respectively the top cylinder portion 8b of the valve sleeve 8 during disconnection action and the fit cylinder portion 23a of the poppet valve 23 after disconnection. Since the O-rings 27, 26 set in the poppet valve 23 and the adapter 22 seal the large-radius longitudinal bore 21f in the male body 21 and the small-radius cylinder portion 23c of the poppet valve 23, the inside fluid never flows into the chamber of the spring 24 within the large-radius longitudinal bore 21f of the male body 21, either.

In another example of this invention as shown in FIG. 4 to FIG. 6, the connection and disconnection operations are effected in the same manner as described in the foregoing example by threadedly fastening or releasing the male screw 1c' provided on the intermediate cylinder portion 1a' of the female body 1' to or from the female screw 28a in the union nut 28 rotatably mounted on the male body 21'.

With a further example of this invention shown in FIG. 7, the connection and disconnection operations are conducted in a similar manner those described in the first example shown in FIG. 3 except that the sub-body 30 in the female body 1" presses against the valve sleeve 8" in the male body 21" thereby to open the flow path of the fluid.

A further example of connection and disconnection operations according to a further aspect of this invention will be described below.

When the female coupling 101A and the male coupling 102A shown in FIGS. 8 and 9 will be put in connection as shown in FIG. 10, the lug sleeve 108 of the female coupling 101A is retreated back to enable the plastic balls 112 to move freely outwards to a limited extent. Then, the top cylinder portion 122a and the medium cylinder portion 122b of the male body 122 are inserted and received in the medium-radius longitudinal bore 122g incorporating the O-ring 114 and the large-radius longitudinal bore 122f of the female body 102, respectively.

When the sleeve 108 is again returned to its initial position, the plastic balls 112 fall onto an annular recess 122d of the male body 122, whereby the female and male couplings 101A, 102A are connected together.

During this connection process, the top edge face of the male poppet 124 is pressed against the top edge face of the female poppet 104 to retreat the female poppet 104 backward against the spring 105, concurrently with which the male poppet 124 is also pressed back by the male poppet 104 to recede against the spring 125. By the simultaneous retreating of both poppets, the transverse hole 104j in the conical face 104c of the female poppet 104 which has been closed so far is put in communication with the space formed owing to the retreating of the poppet valve 104 between the female body 12 and the female poppet 104 whereas the transverse hole 124h in the conical face 124b of the male poppet 124 which hole has been closed so far is put in communication with the space formed owing to the retreating of the poppet valve 124 between the male body 122 and the male poppet 124. As a consequence, the longitudinal hole 104i and the transverse hole 104j of the female poppet 104 and the longitudinal hole 124g and the transverse hole 124h of the male poppet 124 communicate with one another, enabling a fluid to pass through them.

When the foregoing spaces between both the connected couplings and these hole passages are thus in communication with one another, in the female coupling 101A, the chamber of the spring 105 formed on the outer circumference side of the female poppet 14 is rendered fluid-tight with no leakage by the O-rings 106, 107 incorporated, at the front and rear positions of the spring, in the sliding areas between the female body 102 and the female poppet 104 while in the male coupling 102A, the chamber of the spring 125 on the outer circumference side of the male poppet 124 is rendered fluid-tight with no leakage by the O-rings 126 and 127 incorporated, at the front and rear positions of the spring 125, in the sliding areas between the male poppet 124 and the male body 122. There is no leakage of fluid flowing out of the abutting interface between the male and female poppets 104, 124 and the abutting interface between the female and male bodies 102, 122, either, because of the action of the O-ring 114 incorporated in the medium-radius bore portion 102g of the female body 102.

The disconnection operation between the female and male couplings 101A, 102A is effected by the inverted operation to the foregoing operation.

That is, the sleeve 108 is pushed back to recede thereby to make the plastic balls 112 free. Then the male coupling 102A is detached from the female coupling 101A, and the disconnection is finished.

During the disconnection process, the female and male poppets 104, 124 return to their initial positions by means of the springs 105, 125, during which time there is no leakage of fluid because of the provision of the O-rings 106, 107, 126, 127.

The quick-disconnecting coupling assembly for piping use according to this invention have been thus far described with its construction and operation, but in order to impart the coupling assembly further corrosion resistance against acids or alkalis, it is preferred to make the assembly of the following materials.

(1) It is essential that the respective valve members constituting the coupling assembly be made of synthetic plastics having excellent acid resistance of alkali resistance, for example, fluoroplastics, polyethylene, polypropylene or the like.

In case where the coupling assembly is used for strong acids such as hydrofluoric acid used for wet etching of semiconductors or strong alkalis, those that are minimal in dissolved metal products and dust occurrence due to the separation of the valve members etc. are preferred. From this standpoint, fluoroplastics are most preferred for the valve members. The fluoroplastics to be used include for example, polytetrafluoroethylene, copolymer of tetrafluoroethylene and perfluorovinyl ether, copolymer of tetrafluoroethylene and hexafluoropropene, copolymer of tetrafluoroethylene and ethylene, polytrifluorochloroethylene, etc.

(2) The O-rings employed for the coupling assembly are required to be made of synthetic rubbers having good acid resistance or alkali resistance such as fluororubber, butyl rubber, silicone rubber, etc. In case of rendering them resistant to strong acids or strong alkalis, fluororubber is most desirable from the same standpoint as above.

(3) The springs employed for the coupling assembly are unavoidably made of metals such as steels from the viewpoint of springiness, and therefore, it is an essential requisite of this invention that the coupling assembly is constructed so that the springs may not be in direct contact with feeding fluid. However, there is still a possibility of leakage of fluid, even if only in a slight amount, through the O-rings owing to repeated operations of connection and disconnection of the female and male couplings. In order to cope with this problem, therefore, it is necessary to apply a corrosion resistant coating film to the springs. It is preferred to coat a synthetic plastic such as fluoroplastics, polyethylene, polypropylene, etc. on them in a thickness of 300 to 1000 micron. Most preferred are fluoroplastics likewise for the reason of resistance to strong acids or strong alkalis.

Experimental examples of this invention will be hereinafter described.

EXPERIMENTAL EXAMPLE I (1) Materials for the respective members of the coupling assembly examined as a sample are itemized below:

|  | Valve Member | Spring | O-ring |
| --- | --- | --- | --- |
| Material | Polytrifluoro-chloroethylene | SUS Tetrafluoro-ethylene-Hexa-fluoropropene | Fluororubber |
| Manufacturer | DAIKIN INDUSTRIES, LTD. | DAIKIN INDUSTRIES, LTD. | DAIKIN INDUSTRIES, LTD. |
| Trade Name | DAI-FLON M 300H | NEO-FLON FEP Powder Paint Primer ... NC 1539 300 $\mu$m Top Coating ... NC 1500 200 $\mu$m | DAI-EL G 901 |

(2) Dipping test of the samples listed above was conducted under the conditions:

(1) Container: Polytetrafluoroethylene (Poly-Flon M 12 manufactured by DAIKIN INDUSTRIES, LTD.)

(2) Chemical Solution: 50% fluoric acid (3) Dipping Sample: 3 pieces each of the valve members, springs and O-rings (4) Dipping Conditions: Room temperature (23°-27° C.), 6 months (3) Method for Detection and Quantitative Determination of Dissolved-out Products:

(1) Measurement Method: Atomic-absorption Spectroscopic Analysis (AA 650 Model manufactured by Shimadzu Seisakusho K.K. in Japan)

(2) Sampling:

Each solution after dipping is placed in a platinum plate, 1 ml of sulphuric acid (conc. sulfuric acid 1, water 99) is added thereto and the mixture is heated to evaporate the water content and concentrated to dryness to prepare samples. These samples are quantitatively determined.

(4) Results of Dipping Test:

(a) Amount of Dissolved-out Metals:

| Metal Contained in Fluoric Acid (ppm) | Amount of Dissolved-out Metal After Dipping Test (ppm) | | |
| --- | --- | --- | --- |
|  | Valve Member | Spring | O-ring |
| Fe 0.01 | 0.01 | 0.01 | 0.01 |
| Cu 0.002 | 0.002 | 0.003 | 0.003 |
| As 0.002 | 0.002 | 0.002 | 0.003 |
| Na 0.003 | 0.003 | 0.004 | 0.003 |
| Ca 0.02 | 0.02 | 0.02 | 0.03 |
| Zn 0.001 | 0.001 | 0.001 | 0.001 |
| Mn 0.003 | 0.003 | 0.003 | 0.003 |
| Co 0.001 | 0.001 | 0.002 | 0.002 |
| Mg 0.001 | 0.001 | 0.001 | 0.001 |

(b) Number of Dust:

The number of dust having a diameter of above 2 $\mu$m contained in 1 ml of fluoric acid was five pieces before the test. After testing, it was also five pieces with the valve members, springs and O-rings, respectively.

As will be apparent from the dipping test results above, all the valve members, springs and O-rings were not adversely affected in respect of corrosion resistance with little dissolving-out of metals and production of few dusts (due to separation of the valve members and coating films).

EXPERIMENTAL EXAMPLE II

Test of connection and disconnection operations was conducted with the coupling assembly for piping of this invention and results are shown below.

Testing Conditions:

(1) Sample: The same as (1) in Experimental Example I (2) Testing fluid: 50% fluoric acid solution (3) Testing pressure: 2 Kg/cm$^2$ (4) Testing flow: 10 l/m$^2$ (5) One cycle operation of connection and disconnection: 2 times/hr. 700 times in total Test Results:

(1) Appearance ... No change (2) Liquid leakage upon connection and disconnection ... No (3) Springs ... No change (4) Leakage at the O-rings ... No As thus far described, according to this invention, there is provided the corrosion-resistant, quick disconnecting coupling assembly for piping use which operates in a manner admitting of passage or stopping of a fluid by the connection or disconnection between the female coupling and the male coupling as constructed above. That is, each of the female and male couplings comprises an exterior coupling body, a cylindrical valve member mounted in the body having therethrough transverse and longitudinal holes as a flow path of the fluid, communicating with each other, thereby to form an annular chamber enclosed by the coupling body and the valve member and a spring housed in the annular chamber so as to be compressible or extensible. The valve member may be an integral poppet valve being slidable or may consist of two sections, i.e. a valve sleeve being slidable and a fixed valve. Further, preferably O-rings are incorporated in the front and rear positions adjacent to the spring and in the fit position between the female and male couplings upon connection. In this way, the female and male springs are accommodated in the chambers completely isolated from the flow paths of fluid, so that the fluid flowing through the couplings is not in direct contact with the springs during sliding movements upon connection or disconnection between the female and male couplings. Moreover, the spring chambers and the respective couplings are tightly sealed by the O-rings.

Therefore, there is neither leakage of the fluid outside nor leakage of the fluid to the spring chambers during connection or disconnection, so that corrosion of the springs is avoided and fluid-tightness of the coupling assembly is ensured. Accordingly, durability of the coupling assembly can be maintained.

According to the quick disconnecting coupling assembly of this invention, only the connection or disconnection operation between the female and male couplings enables a fluid to pass through the flow paths or to stop, and so, feeding of corrosive fluids can be effected very easily and simply.

Further advantageous feature consists in that the coupling assembly of this invention can be used for all kinds of chemical agents since it is rendered chemical resistant by making the valve members of a synthetic plastic and the O-rings of a synthetic rubber and by coating the springs with a synthetic plastic film as at F, particularly it can be imparted corrosion resistance to strong acids or strong alkalis by making the valve members of a fluoroplastic and the O-rings of a fluororubber and by coating the springs with a fluoroplastic.

The embodiments of the invention in which an exclusive property or privilege is claimed are defined as follows:

1. A corrosion-resistant, quick disconnecting coupling assembly for piping use consisting of a female coupling means and a male coupling means for causing or stopping the conduction of a fluid by connection or disconnection between both, in which assembly:

said female coupling means comprises an exterior female body and, first means defining a first fluid path therethrough, a cylindrical first valve means mounted in said female body for forming an enclosure by and between said female body and said first valve means thereby to define a first annular closed chamber on a first side of said first valve means and an open cavity on a second side of said first valve means and second means for isolating said first annular chamber from said first fluid path, said first valve means comprising a first hollow cylindrical portion defining a part of said first fluid path and having a first top closure end and a first separable partition means extending radially outwardly from said first closure end for normally blocking fluid flow, and having, through said first cylindrical portion, a first transverse hole and a first longitudinal hole serving each as a path of fluid flow and communicating with each other, at least a portion of said first separable partition means of said first valve means being slidingly movable to separate from a remaining portion to allow fluid to flow, said first transverse hole being a part of said first fluid path and located adjacent said separable partition means of said first valve means between said open cavity and said first hollow cylindrical portion, and a first spring housed in said first annular closed chamber, axially extending between said movable portion of said first separable partition means and said female body so as to be compressible or extensible thereby to enable said first transverse hole to open or close upon compression or extension of said first spring, said second means thereby isolating said first spring from said fluid path; and said male coupling means comprises an exterior male body having an elongted fit cylindrical portion thereon and third means defining a second fluid path therethrough, a cylindrical second valve member mounted in said male body so as to form an enclosure by and between the male body and said second valve means thereby to define a second annular closed chamber and fourth means for isolating said second annular chamber from said second fluid path, said second valve means consisting of a second hollow cylindrical portion having a second top closure end and a second separable partition means extending radially outwardly from said second closure end, and having, through said second cylindrical portion, a second transverse hole and a second longitudinal hole serving each as a path of fluid flow and communicating with each other, at least said second partition means of said second valve means being slidingly movable, said second transverse hole being located adjacent said second partition means, and a second spring housed in said second annular chamber, extending axially between said second partition means and said male body so as to be compressible or extensible thereby to enable said second transverse hole to open or close upon compression or extension of said second spring, said fourth means thereby isolating said second spring from said fluid path, whereby when said female coupling means and said male coupling means are connected to each other, said fit cylindrical portion of said male body is received and fitted in said open cavity of said female body in a telescopic manner, said movable portions of said first and second partition means being both moved in their respective bodies up to the compression limit positions of said first and second springs, said first and second top closure ends being in abutment with each other, and said first and second transverse and said first and second longitudinal holes are put in communication with one another.

2. A corrosion resistant, quick disconnecting coupling assembly as claimed in claim 1, wherein said first valve means includes a fixed portion of said first separable partition means as a said first cylindrical portion and a valve sleeve as a said movable portion of said first separable partition means, both of which are separately formed, said valve sleeve being fitted to said fixed portion and said female body and being slidably movable, said fixed portion being fastened to said female body on a rear side thereof;

said valve sleeve and said female body having an O-ring incorporated respectively in fit positions in front of and at the rear of said first spring;

said second valve means is a poppet valve in which said cylindrical portion and said second partition portion of said second valve means are formed as an integral member, said poppet valve being fitted to said male body at its opposite ends and being slidingly movable;

said poppet valve and said male body having an O-ring incorporated respectively in fit positions in front of and at the rear of said male spring;

said male body includes an adapter on a rear side thereof and has an O-ring incorporated in an internal surface adjacent a front end thereof.

3. A corrosion resistant, quick disconnecting coupling assembly as claimed in claim 2, wherein said fixed portion has an O-ring incorporated short of said first transverse hole in a fit position of said top closure end to said valve sleeve, thereby to ensure a leak-tight seal upon disconnection; and said female and male bodies and said first and second valve means are made of a synthetic plastic, said O-rings of said female and male coupling means are made of a synthetic rubber, and said first and second springs are coated with a synthetic plastic.

4. A corrosion resistant, quick disconnecting coupling assembly as claimed in claim 3, wherein said synthetic plastic is a fluoroplastic and said synthetic rubber is a fluororubber.

5. A corrosion resistant, quick disconnecting coupling assembly as claimed in claim 2, wherein said female body has a lug sleeve slidably mounted thereon and a plurality of V-shaped apertures radially pierced through it in which plastic balls are captively held by said sleeve, and said male body has on the outer circumference thereof a groove capable of capturing thereon said plastic balls.

6. A corrosion resistant, quick disconnecting coupling assembly as claimed in claim 2, wherein said male body has a union nut rotatably mounted thereon, which nut has a female screw, and said female body is formed thereon with a male screw capable of being threaded into said female screw of said nut.

7. A corrosion resistant, quick disconnecting coupling assembly as claimed in claim 1, wherein
said female body includes a sub-body and an adapter on a rear side of said female coupling means;
said movable partition portion being a poppet valve and said first cylindrical portion and said other partition portion are integral, said poppet valve being fitted to said adapter and said sub-body and being slidingly movable;
said poppet valve and said adapter having an O-ring incorporated respectively in fit positions in front of and at the rear of said first spring;
said sub-body having an O-ring incorporated in its front end;
said second valve means consists of a fixed valve as a said second cylindrical portion and a sleeve valve as a said second partition means, both of which are separately formed,
said valve sleeve being fitted to said fixed valve and said male body and being slidably movable,
said fixed valve being fastened to said male body at its rear end;
said valve sleeve and said male body having each an O-ring incorporated respectively in fit positions in front of and at the rear of said first spring.

8. A corrosion resistant, quick disconnecting coupling assembly as claimed in claim 7, wherein said fixed valve in said male body has an O-ring incorporated in its top closure end short of said second transverse hole thereby to ensure a leak-tight seal upon disconnection; and
wherein said female and male bodies and said first and second valve means are made of a synthetic plastic, said O-rings of said female and male coupling means are made of a synthetic rubber and said first and second springs are coated with a synthetic plastic.

9. A corrosion resistant, quick disconnecting coupling assembly as claimed in claim 8, wherein said synthetic plastic is a fluoroplastic and said synthetic rubber is a fluororubber.

10. A corrosion resistant, quick disconnecting coupling assembly as claimed in claim 7, wherein said female body has a lug sleeve slidably mounted thereon and a plurality of V-shaped apertures radially pierced through it in which plastic balls are retained by said sleeve, and said male body has on the outer circumference thereof a groove capable of capturing thereon said plastic balls.

11. A corrosion resistant, quick disconnecting coupling assembly as claimed in claim 3, wherein said male body has a union nut rotatably mounted thereon, which nut has a female screw, and said female body is formed thereon with a male screw capable of being threaded into said female screw of said nut.

12. A corrosion resistant, quick disconnecting coupling assembly as claimed in claim 1, wherein
said female body and said male body each include an adapter on a rear side of each coupling;
said first valve means and said second valve means are each a poppet valve in which said cylindrical portion and said other partition portion of each coupling are integrally formed, said poppet valve each being fitted to said coupling body and being slidingly movable;
said poppet valve and said adapter of each coupling having an O-ring incorporated respectively in fit positions in front of and at the rear of each said spring;
said female body has an O-ring incorporated in its front inner portion facing said open cavity.

13. A corrosion resistant, quick disconnecting coupling assembly as claimed in claim 12, wherein said poppet valves in said female and male bodies have each an O-ring incorporated respectively in the top closure ends short of said first and second transverse holes; and
wherein said poppet valves and said female and male bodies are made of a synthetic plastic, said O-rings of said female and male coupling means are made of a synthetic rubber, and said first and second springs are coated with a synthetic plastic.

14. A corrosion resistant, quick disconnecting coupling assembly as claimed in claim 13, wherein said synthetic plastic is a fluoroplastic and said synthetic rubber is a fluororubber.

15. A corrosion resistant, quick disconnecting coupling assembly as claimed in claim 12, wherein said female body has a lug sleeve slidably mounted thereon and a plurality of V-shaped apertures radially pierced through it, in which plastic balls are retained by said sleeve, and said male body has on the outer circumference thereof a groove capable of capturing thereon said plastic balls.

16. A corrosion resistant, quick disconnecting coupling assembly as claimed in claim 12, wherein said male body has a union nut rotatably mounted thereon, which nut has a female screw, and said female body is formed thereon with a male screw capable of being threaded into said female screw of said nut.

* * * * *